United States Patent [19]
Schmidt et al.

[11] Patent Number: 5,644,014
[45] Date of Patent: Jul. 1, 1997

[54] COATING COMPOSITIONS BASED ON FLUORINE-CONTAINING INORGANIC POLYCONDENSATES, THEIR PRODUCTION AND THEIR USE

[75] Inventors: Helmut Schmidt, Saarbrücken-Güdingen; Reiner Kasemann, Mandelbachtal-Ormesheim; Stefan Brück, Merchweiler, all of Germany

[73] Assignee: Institut Für Neue Materialien gemeinnützige GmbH, Saarbrücken, Germany

[21] Appl. No.: 150,003

[22] PCT Filed: Jun. 3, 1992

[86] PCT No.: PCT/EP92/01233

§ 371 Date: Apr. 29, 1994

§ 102(e) Date: Apr. 29, 1994

[87] PCT Pub. No.: WO92/21729

PCT Pub. Date: Dec. 10, 1993

[30] Foreign Application Priority Data

Jun. 3, 1991 [DE] Germany .................. 41 18 184.0

[51] Int. Cl.$^6$ .................................. C08G 77/24
[52] U.S. Cl. ...................... 528/43; 528/10; 528/32
[58] Field of Search ............................ 528/10, 47

[56] References Cited

FOREIGN PATENT DOCUMENTS

| 3836815 | 7/1990 | Germany . |
| 75-140388 | 2/1974 | Japan . |
| 52-038950 | 10/1977 | Japan . |

*Primary Examiner*—Ralph H. Dean
*Attorney, Agent, or Firm*—Oblon, Spivak, McClelland, Maier & Neustadt, P.C.

[57] ABSTRACT

A coating composition is disclosed based on polycondensates of hydrolyzable compounds in particular of Si, Al, Ti and/or Zr, whereas at least part of the non-hydrolyzable groups linked to these elements contain in average 2 to 30 fluorine atoms linked to aliphatic carbon atoms. A process for producing such coating compositions is also disclosed. The corresponding cured (transparent) coatings are characterized in particular by a very good adherence to various types of substrates, in particular glass, besides an antiadhesive effect with respect to many different materials.

30 Claims, No Drawings

COATING COMPOSITIONS BASED ON FLUORINE-CONTAINING INORGANIC POLYCONDENSATES, THEIR PRODUCTION AND THEIR USE

The present invention relates to coating compositions based on fluorine-containing inorganic polycondensates as well as the preparation and the use thereof.

There are already known numerous coating compositions which are based on organically modified inorganic polycondensates, particularly those of Si, Al, Ti and Zr, and after a corresponding curing result in coatings for a wide variety of substrates, said coatings having the most different advantageous properties, e.g. outstanding scratch resistance, flexibility, transparency and/or abrasion resistance. Nevertheless, said known coating systems still leave room for improvement, particularly as regards their anti-adhesion properties towards hydrophilic and oleophilic substances as well as towards dust.

Thus, the problem underlying the present invention was to provide a coating composition which besides the excellent properties of the already known coating systems based on inorganic polycondensates modified with organic groups, particularly transparency, mechanical strength and abrasion resistance, also exhibits outstanding anti-adhesion properties towards the most different substances.

According to the present invention the above problem is solved by a coating composition based on polycondensates of one or more hydrolyzable compounds of elements M of the main groups III to V and the subgroups II to IV of the periodic system of elements, at least part of said compounds having non-hydrolyzable carbon containing groups B in addition to hydrolyzable groups A and the total molar ratio of groups A to groups B in the monomeric starting compounds from which they are derived ranging from 10:1 to 1:2, said coating composition being characterized in that 0.1 (and particularly 0.5) to 100 mol-% of said groups B are groups B' which on the average have 2 to 30 fluorine atoms bonded to one or more aliphatic carbon atoms which carbon atoms are separated from M by at least two atoms.

The preparation of such coating compositions generally cannot be carried out satisfactorily by means of the common methods for the provision of such coating systems, particularly if transparent coatings are to be obtained, as upon the addition of water necessary for the hydrolysis of the starting compounds, the starting compounds having (fluorinated) groups B' tend to separate, thereby resulting in a two-phase system with which a satisfactory homogeneous coating composition cannot be achieved anymore. Thus, another problem underlying the present invention also was to provide a process for the preparation of the above coating composition wherein the just mentioned problems do not occur.

Accordingly, object of the present invention is also a process for the preparation of the coating composition defined above, which process is characterized in that initially all or a part of the starting compounds without groups B' are hydrolyzed and precondensed by the addition of water whereafter the starting compounds having said groups B' are added and after the reaction of the latter with the already present prehydrolyzed starting compound and the precondensates, respectively the hydrolysis and condensation of the species present is continued by adding further water and, optionally, the remainder of the starting compounds without groups B' until an applicable system is obtained, the addition of said starting compounds having groups B' being carried out only after the water content of the system is not higher than 5% by weight, based on the total weight of the system without solvent optionally employed, and not more than 50% of the theoretically possible groups M—OH are present in the system.

Thus, in the preparation process according to the present invention, precondensates are first prepared and only then the fluorinated starting compounds are added, said fluorinated starting compounds being then bonded to said precondensates by hydrolysis and condensation and thereafter do not result in phase separation upon further addition of water anymore, so that a homogeneous coating system cab be obtained.

The hydrolyzable starting compounds used for the preparation of the coating composition of the present invention are preferably those of Si, Al, B, Pb, Sn, Ti, Zr, V and Zn, particularly those of Si, Al, Ti and Zr or mixtures thereof. It should be appreciated that naturally also other hydrolyzable compounds may be employed, particularly those of elements of the main groups I and II of the periodic system (e.g. Na, K, Ca and Mg) and of the subgroups V to VIII of the periodic system (e.g. Mn, Cr, Fe and Ni). Hydrolyzable compounds of the lanthanides may also be employed. However, the just mentioned compounds preferably do not account for more than 20%, and particularly not more than 10 mol-%, of the total of the hydrolyzable monomeric compounds employed (or of the compounds from which they are derived, respectively).

Examples of hydrolyzable groups A in said starting compounds (which may be employed not necessarily as monomeric compounds but already as corresponding precondensates of compounds of one or more of the elements M) are halogen (F, Cl, Br and I, particularly Cl and Br), alkoxy (particularly $C_{1-4}$-alkoxy, such as, e.g., methoxy, ethoxy, n-propoxy, i-propoxy and butoxy), aryloxy (particularly $C_{6-10}$-aryloxy, e.g. phenoxy), acyloxy (particularly $C_{1-4}$-acyloxy, such as, e.g., acetoxy and proplonyloxy) and alkylcarbonyl (e.g. acetyl).

In addition to the hydrolyzable groups A mentioned above, hydrogen and alkoxy radicals having 5 to 20, particularly 5 to 10 carbon atoms and alkoxy groups substituted with halogen and alkoxy (such as, e.g. β-methoxyethoxy) may be mentioned as further groups which are also suitable.

Since the hydrolyzable groups A will not be present in the final product to any substantial extent, but will be lost by hydrolysis and the product of said hydrolysis will have to be removed sooner or later in any suitable manner, particularly preferred are hydrolyzable groups A which do not have any substituents and result in hydrolysis products of low molecular weight, such as, e.g., lower alcohols such as methanol, ethanol, propanol, n-, i-, sec- and tert-butanol. The latter groups A are preferred also because they do not significantly affect the pH value during hydrolysis (in contrast to, e.g., halogen), which is advantageous because the pH value of the reaction mixture prior to the addition of the fluorine-containing starting compounds preferably ranges from 4 to 9, particularly 5 to 6.5, and products of hydrolysis which significantly shift the pH value outside the range just indicated are preferably neutralized through the addition of suitable substances (acids or bases).

The non-hydrolyzable groups B other than the groups B' are preferably selected from alkyl (particularly $C_{1-4}$-alkyl, such as, e.g., methyl, ethyl, propyl and butyl), alkenyl (particularly $C_{2-4}$-alkenyl, such as, e.g., vinyl, 1-propenyl, 2-propenyl and butenyl), alkynyl (particularly $C_{2-4}$-alkynyl, such as acetylenyl and propargyl) and aryl (particularly $C_{6-10}$-aryl, such as, e.g. phenyl and naphthyl); the groups just mentioned may optionally have one or more substituents, such as, e.g., halogen, hydroxy, alkoxy, epoxy, optionally substituted amino etc. The above alkyl radicals also include the corresponding cyclic and aryl-substituted radicals, such as cyclohexyl and benzyl, while said alkenyl and alkynyl groups may also be cyclic and the mentioned aryl groups also are meant to include alkaryl groups (such as tolyl and xylyl). Particularly preferred non-hydrolyzable groups B are those which have a (multiple) unsaturated carbon-to-carbon-bond. Groups having a (meth)acryloxy radical, particularly a (meth)acryloxy-$C_{1-4}$-alkyl radical such as, e.g., (meth)acryloxypropyl are to be mentioned particularly in that context. The presence of such unsaturated groups in the corresponding polycondensates is advantageous in that following the application of the coating composition onto a certain substrate a two-fold curing can be carried out, i.e., a thermal or photochemically induced linking of the unsaturated organic radicals through (radical) polymerization and a thermal completion of the polycondensation (e.g. by elimination of water from groups M—OH still present).

According to the present invention it is thus preferred that 1 to 100, particularly 5 to 85 and particularly preferred 20 to 70 mol-% of the groups B (including the groups B') have at least one carbon-to-carbon double or triple bond.

Particularly with compounds which in comparison to silicon compounds are very reactive during hydrolysis (e.g. Al compounds, but also compounds or Zr and Ti) it may be advisable to employ the corresponding starting compounds in complexed form in order to avoid a spontaneous precipitation of the corresponding hydrolyzates upon addition of water. Suitable complexing agents are particularly organic (optionally unsaturated) carboxylic acids (such as, e.g., acrylic acid and methacrylic acid), β-diketones (e.g. acetyl acetone) and β-carbonyl carboxylic acid esters (such as, e.g., ethyl acetoacetate). All other complexing agents known in this field may, however, also be employed, it being usually sufficient to use the compounds to be hydrolyzed (e.g. aluminum compounds) in admixture with said complexing agent.

According to the present invention it is preferred that the total molar ratio of groups A to groups B in the total starting compounds (including the fluorinated ones) is 5:1 to 1:1 and particularly 4:1 to 2:1. In this respect it is to be kept in mind that said ratio relates to monomeric starting compounds, i.e. a recalculation has to be carried out if precondensates are employed.

Specific examples of non-fluorinated silicon starting compounds (i.e. compounds without groups B') for the preparation of the coating composition according to the present invention are as follows:

Si(OCH$_3$)$_4$, Si(OC$_2$H$_5$)$_4$, Si(O-n- oder i-C$_3$H$_7$)$_4$

Si(OC$_4$H$_9$)$_4$, SiCl$_4$, HSiCl$_3$, Si(OOCCH$_3$)$_4$ CH$_3$—SiCl$_3$, CH$_3$—Si(OC$_2$H$_5$)$_3$, C$_2$H$_5$—SiCl$_3$, C$_2$H$_5$—Si(OC$_2$H$_5$)$_3$,

C$_3$H$_7$—Si(OCH$_3$)$_3$, C$_6$H$_5$—Si(OCH$_3$)$_3$, C$_6$H$_5$—Si(OC$_2$H$_5$)$_3$, (CH$_3$O)$_3$—Si—C$_3$H$_6$—Cl, (CH$_3$)$_2$SiCl$_2$, (CH$_3$)$_2$Si(OCH$_3$)$_2$, (CH$_3$)$_2$Si(OC$_2$H$_5$)$_2$, (CH$_3$)$_2$Si(OH)$_2$, (C$_6$H$_5$)2SiCl$_2$, (C$_6$H$_5$)$_2$Si(OCH$_3$)$_2$, (C$_6$H$_5$)$_2$Si(OC$_2$H$_5$)$_2$, (i-C$_3$H$_7$)$_3$SiOH,

CH$_2$=CH—Si(OOCCH$_3$)$_3$

CH$_2$=CH—SiCl$_3$, CH$_2$=CH—Si(OCH$_3$)$_3$, CH$_2$=CH—Si(OC$_2$H$_5$)$_3$,

CH$_2$=CH—Si(OC$_2$H$_4$OCH$_3$)$_3$, CH$_2$=CH—CH$_2$—Si(OCH$_3$)$_3$,

CH$_2$=CH—CH$_2$—Si(OC$_2$H$_5$)$_3$,

CH$_2$=CH—CH$_2$—Si(OOCCH$_3$)$_3$,

CH$_2$=C(CH$_3$)—COO—C$_3$H$_7$—Si(OCH$_3$)$_3$,

CH$_2$=C(CH$_3$)—COO—C$_3$H$_7$—Si(OC$_2$H$_5$)$_3$, (C$_2$H$_5$O)$_3$Si—C$_6$H$_4$—NH$_2$, CH$_3$(C$_2$H$_5$O)$_2$Si—(CH$_2$)$_4$—NH$_2$, (C$_2$H$_5$O)$_3$Si—C$_3$H$_6$—NH$_2$, (CH$_3$)$_2$ (C$_2$H$_5$O)Si—CH$_2$—NH$_2$, (C$_2$H$_5$O)$_3$Si—C$_3$H$_6$—CN, (CH$_3$O)$_3$Si—C$_4$H$_8$—SH, (CH$_3$O)$_3$Si—C$_6$H$_{12}$—SH, (CH$_3$O)$_3$Si—C$_3$H$_6$—SH, (C$_2$H$_5$O)$_3$Si—C$_3$H$_6$—SH, (CH$_3$O)$_3$Si—C$_3$H$_6$—NH—C$_2$H$_4$—NH$_2$, (CH$_3$O)$_3$Si—C$_3$H$_6$—NH—C$_2$H$_4$—NH—C$_2$H$_4$—NH$_2$,

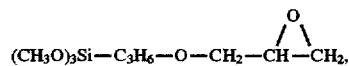

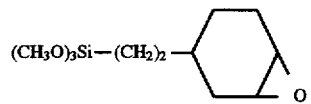

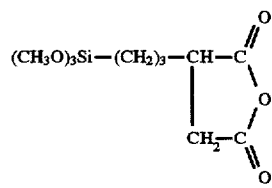

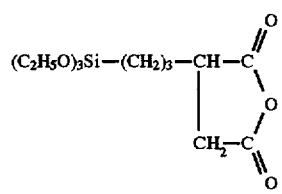

Said silanes may be prepared according to known methods; cf. W. Noll "Chemie und Technologie der Silicone", Verlag Chemie GmbH, Weinheim/Bergstraβe (1968).

As already mentioned, the silicon compounds employable according to the present invention may be used, as a whole or in part, in the form of precondensates, i.e., compounds which have been produced by partial hydrolysis of the corresponding monomeric compounds, either alone or in admixture with hydrolyzable compounds of other elements M which will be described in more detail hereinbelow. Such oligomers which preferably are soluble in the reaction medium may be straight chain or cyclic, low molecular weight partial condensates (polyorganosiloxanes), having a degree of condensation of, e.g., 2 to 100 (e.g., 2 to 20), particularly 6 to 10.

Preferred aluminum compounds employed according to the present invention have the general formula AlX$_3$ wherein the radicals X, which may be the same or different, are selected from halogen, alkoxy, alkoxycarbonyl and hydroxy. With respect to the more detailed (preferred) definition of said radicals, the comments in the introductory part may be referred to.

Particularly preferred aluminum starting compounds are the aluminum alkoxides and, to a limited extent, also the aluminum halides. In this context, the following ones may be mentioned as specific examples:

Al(OCH$_3$)$_3$, Al(OC$_2$H$_5$)$_3$, Al(O-n-C$_3$H$_7$)$_3$, Al(O-i-C$_3$H$_7$)$_3$, Al(OC$_4$H$_9$)$_3$, Al(O-i-C$_4$H$_9$)$_3$, Al(O-sec-C$_4$H$_9$)$_3$, AlCl$_3$, AlCl(OH)$_2$ Compounds liquid at room temperature such as, e.g., aluminum sec-butylate and aluminum isopropylate are particularly preferred. This also applies to the rest of the hydrolyzable compounds employable according to the present invention.

Suitable hydrolyzable titanium and zirconium compounds which may be employed according to the present invention are, for example, those of the general formula $$M'X_nR_{4-n}$$

wherein M' represents Ti or Zr and X is defined as above. R represents a non-hydrolyzable group A of the type defined above and n is an integer of from 1 to 4, particularly preferred 4.

Specific examples of zirconium and titanium compounds which may be employed according to the present invention are the following ones:

TiCl$_4$, Ti(OC$_2$H$_5$)$_4$, Ti(OC$_3$H$_7$)$_4$, Ti(O-i-C$_3$H$_7$)$_4$, Ti(OC$_4$H$_9$)$_4$, Ti(2-ethylhexoxy)$_4$;

ZrCl$_4$, Zr(OC$_2$H$_5$)$_4$, Zr(OC$_3$H$_7$)$_4$, Zr(O-i-C$_3$H$_7$)$_4$, Zr(OC$_4$H$_9$)$_4$, ZrOCl$_2$, Zr(2-ethylhexoxy)$_4$ Further hydrolyzable compounds which may be employed according to the present invention (preferably in minor amounts) are boron trihalides and boric acid esters (such as, e.g., BCl$_3$, B(OCH$_3$)$_3$ and B(OC$_2$H$_5$)$_3$), tin tetrahalides and tin tetraalkoxides (such as, e.g., SnC$_{14}$ and Sn(OCH$_3$)$_4$) and vanadyl compounds, such as, e.g., VOCl$_3$ and VO(OCH$_3$)$_3$.

In the coating compositions according to the present invention all, but at least 0.1 mol-%, of the non-hydrolyzable groups B bonded to the elements M may be groups B' which on the average have 2 to 30 fluorine atoms bonded to one or more aliphatic (including cycloaliphatic) carbon atoms which carbon atoms are separated from M by at least two atoms. Preferably 1 to 50, and particularly 2 to 30 mol-%, of the groups B are groups B', a particularly preferred percentage ranging form 5 to 25 mol-%.

Preferably the groups B' contain on the average 5 to 25 and particularly 8 to 18 fluorine atoms bonded to aliphatic carbon atoms, those fluorine atoms which are optionally bonded in a different manner, e.g., to aromatic carbon atoms (for example in the case of C$_6$F$_4$) not being considered. The fluorine containing group B' may also be a chelating ligand. One or more fluorine atoms may also be present on a carbon atom from which a double or triple bond originates. Since the groups B' only need to have two corresponding fluorine atoms on the average, groups B' having only 1 fluorine atom may also be employed, provided that at the same time a sufficient number of groups B' having more than 2 fluorine atoms is present.

Particularly in view of the availability of the corresponding starting substances, silicon compounds having groups B' are preferred starting compounds. Specific examples of such silicon compounds, most of which are commercially available, are the following ones:

CF$_3$CH$_2$CH$_2$—SiY$_3$⁻
C$_2$F$_5$CH$_2$CH$_2$—SiY$_3$
C$_4$F$_9$CH$_2$CH$_2$—SiY$_3$
n-C$_6$F$_{13}$⁻CH$_2$CH$_2$ —SiY$_3$⁻
n-C$_8$F$_{17}$CH$_2$CH$_2$—SiY$_3$ n-C$_{10}$F$_{21}$CH$_2$CH$_2$—SiY$_3$
(Y=OCH$_3$, OC$_2$H$_5$ oder Cl)
CF$_3$CH$_2$CH$_2$SiCl$_2$(CH$_3$)
CF$_3$CH$_2$CH$_2$SiCl(CH$_3$)$_2$
CF$_3$CH$_2$CH$_2$Si(CH$_3$) (OCH$_3$)$_2$
i-C$_3$F$_7$O—(CH$_2$)$_3$—SiCl$_2$(CH$_3$)
n-C$_6$F$_{13}$CH$_2$CH$_2$SiCl$_2$(CH$_3$)
n-C$_6$F$_{13}$CH$_2$CH$_2$SiCl(CH$_3$)$_2$ Particularly in case the groups B in the polycondensates of the coating composition according to the present invention include groups B having unsaturated carbon-to-carbon bonds, the coating composition according to the present invention preferably also contains a catalyst for the thermal and/or photochemically induced curing of the coating composition applied onto a suitable substrate. Particularly preferred is the addition of a photopolymerization initiator. As photoinitiators for example those which are commercially available may be employed. Examples thereof are Irgacure® 184 (1-hydroxycyclohexyl phenyl ketone), Irgacure® 500 (1-hydroxycyclohexyl phenyl ketone, benzophenone) and other photo-initiators of the Irgacure®-type available from the company Ciba-Geigy; Darocur® 1173, 1116, 1398, 1174 and 1020 (available from the company Merck), benzophenone, 2-chlorothioxanthone, 2-methyl thioxanthone, 2-isopropyl thioxanthone, benzoin, 4,4'-dimethoxy benzoin, benzoin ethyl ether, benzoin isopropyl ether, benzyl dimethyl ketale, 1,1,1-trichloro acetophenone, diethoxy acetophenone and dibenzosuberone.

Examples of optionally employed thermal initiators are, among others, organic peroxides in the form of diacyl, peroxides, peroxydicarbonates, alkyl peresters, dialkyl peroxides, perketales, ketone peroxides and alkyl hydroperoxides. Specific examples of such thermal initiators are dibenzoyl peroxide, tert-butyl perbenzoate and azobisisobutyronitrile.

The above initiators are added to the coating composition in usual amounts. For example, to a varnish having a solids content of 30 to 50% by Weight an initiator may thus be added in an amount of, e.g., 0.5 to 2% by weight (based on the total amount).

If it is intended to photochemically or thermally cure unsaturated groups B in the polycondensates it may also be expedient to add organic unsaturated compounds to the coating composition which compounds may then copolymerize with said unsaturated groups of the polycondensates. Examples of such unsaturated organic compounds are styrene, acrylic acid, methacrylic acid and corresponding derivatives (e.g. esters, amides, nitriles) of the acids just mentioned.

Such compounds may also be partially or totally fluorinated (e.g. C$_n$F$_x$COOH with n=1–20). Also employed may be compounds having (per)fluorinated groups which during the preparation of the coating composition react with groups B, thereby providing groups B' (e.g. by reaction of groups S—H or N—H with hexafluoropropene oxide or by polymerization of carbon-to-carbon double bonds (only) upon acidification of the coating composition already applied).

As already mentioned above, the preparation of the coating composition according to the present invention usually cannot be carried out by mixing the starting compounds to be hydrolyzed and condensed and subsequent addition of water in a suitable manner since in this case the hydrolyzable starting compounds having groups B' usually result in a phase separation and thus no satisfactory coating composition can be obtained.

According to the present invention an initial hydrolysis and precondensation without participation of the starting compounds having groups B' is thus carried out and only thereafter the latter compounds are added to the mixture which surprisingly does not result in the occurrence of phase separation. Thereafter, the hydrolysis and polycondensation may be continued by adding further water and, optionally, further starting compounds without groups B'. The reaction may then be conducted in a manner known per se until a system capable of being applied is obtained.

In the preparation of the coating composition according to the present invention it is important that the concentration of free water in the system does not exceed 5% by weight, particularly 3.5% by weight and particularly preferred 2% by weight and that at the most only 50% of the theoretically possible groups M—OH are present when the starting compounds having groups B' are added. In order to ensure that the above parameters are actually within the limits just described, prior to the addition of the fluorine containing starting compounds a titration (e.g. according to Karl Fischer) and/or a spectroscopic determination (e.g. by means of $^{29}$Si-NMR) may, for example, be carried out.

As already mentioned, with the exception of the point of time of the addition of the fluorinated starting compounds, the preparation of the coating composition according to the present invention may be carried out in a manner usual in this field. In case silicone compounds (which are relatively sluggish in the hydrolysis) are employed initially (substantially) exclusively, in most cases the hydrolysis may be carried out by adding water at room temperature or with slight cooling directly to the silicon compound(s) to be hydrolyzed (preferably with stirring) and thereafter the resulting mixture is stirred for a while (several minutes to several hours). In case the more reactive compounds of, e.g., Al, Ti and Zr are present, the stepwise addition of water is usually advisable. Independently of the reactivity of the compounds present, the hydrolysis is usually carried out at a temperature not higher than 50° C., preferably between 0° C. and 30° C. or the boiling point of the optionally employed solvent, respectively. In general a solvent need not be employed, particularly in case the hydrolyzable groups A are those which upon hydrolysis result in the formation of (lower) alcohols, such as, e.g., methanol, ethanol, propanol and butanol. In all other cases (e.g. when employing halosilanes), examples of suitable solvents are the alcohols just mentioned, as well as ethers, preferably lower dialkyl ethers such as diethyl ether and dibutyl ether and THF, aromatic hydrocarbons (e.g. toluene), esters such as ethyl acetate and, particularly, butoxy ethanol. A solvent may, of course, also be employed in case the hydrolysis results exclusively in (lower) alcohols as by-products.

Regarding the total amount of water to be employed for the hydrolysis it is noted that it is particularly preferred for the molar ratio of total water added to hydrolyzable groups A in the total of the starting compounds employed to range from 1:1 to 0.3:1, particularly from 0.7:1 to 0.5:1.

The coating composition prepared according to the process of the present invention may be applied onto a suitable substrate either as such or after partial or almost complete removal of the solvent employed or the solvent formed during the reaction (e.g. the alcohols formed by hydrolysis of the alkoxides), respectively, or following the addition of a suitable solvent in order to reduce the viscosity.

Particularly in case the preparation of the varnish has been carried out without a solvent and with addition of water in the lower part of the range preferred according to the present invention, it may be necessary to dilute the coating composition prior to application with a suitable organic solvent. Toluene, ethyl acetate, THF, glycolic acid butyl ester, butoxy ethanol, ethyleneglycol mono- and di-ethylether and mixtures thereof are particularly suitable for said purpose. If the coating composition is diluted with a solvent the ratio of the amount of varnish to the amount of solvent is preferably in the range of from 1:0.5 to 1:2.

If it is intended to cure the coating composition by irradiation, a photo-initiator must be added to the coating composition prior to the application thereof (see above). Preferably an initiator is also added if the curing is to be carried out thermally.

At the latest prior to the use of the varnish, conventional additives for varnishes may be added thereto, such as, e.g., colorants, fillers, oxidation inhibitors, levelling agents, UV-absorbers and the like.

The coating composition optionally (and preferably) provided with an initiator and, optionally, the above additives, is then applied onto a suitable substrate. Conventional coating methods may be employed for said coating operating, e.g., dipping, flooding, drawing, casting, spinning, spraying or brushing. Drawing, spraying and spinning are particularly preferred according to the present invention. Prior to curing, the applied coating composition is preferably dried (at room temperature or slightly elevated temperature). Preferred coating thicknesses (in the cured state) range from 1 to 100, particularly 5 to 30 µm.

Following the optionally conducted drying, the coating composition applied onto the substrate may be cured thermally and/or by irradiation (e.g. by means of UV-irradiators, a laser, etc.) in a manner known per se, depending on the type and presence, respectively of an initiator.

In the case of thermal curing, the curing temperatures are preferably at least 50° C., particularly at least 90° C. The maximum curing temperature is determined, among others, also by the thermal resistance of the substrate to be coated. In the case of glass or metals, curing temperatures of up to 350° C. may be employed. Preferably, however, the curing temperatures do not exceed 200° C. and particularly 180° C. The curing time usually is 1 to 2 hours.

Glass, ceramics, metal, plastics and paper are particularly suitable substrates to be coated. As examples of metals copper, aluminum, brass, iron and zinc may, for instance, be mentioned. Among the polymers, particularly transparent polymers such as polycarbonate, polymethyl methacrylate, polyacrylates, but also polyethylene terephthalate, deserve to be mentioned.

The coatings obtainable with the coating compositions according to the present invention are particularly characterized in that they are transparent and mechanically resistant, and additionally show an anti-adhesion effect towards the most different materials, which effect in fact is equivalent or even superior to that of coatings based on polytetrafluoroethylene, polyvinylidene fluoride etc. While, for example, PTFE is substantially non-adherent to materials such as glass, the coatings obtainable according to the present invention show a very good adhesion not only to glass (particularly in case major portions of groups M—OH are still present in the not yet fully cured coating composition), but also to plastics and metals (which may optionally be pretreated in a suitable manner, e.g., by means of corona treatment).

Particularly in consideration of the good adhesion to glass, the coating compositions according to the present invention are particularly suitable for the coating of glass for which a soil, water and oil repellent surface is particularly desirable, e.g. for the coating of (particularly outer) mirrors of motor vehicles, but also for windshields.

The following examples illustrate the present invention.

EXAMPLE 1

One mol of 3-methacryloxypropyl trimethoxysilane (MEMO) is reacted, for 1 hour at 50° C. in 3 mols of methanol, with 1.5 mol of bidistilled water. After cooling below 0° C. 0.1 to 0.3 mol of zirconiumtetrapropylate, either as such or in combination with 0.1 to 0.6 mol of methacrylic acid, are added thereto. After having checked the water content up to 0.6 mol of bidistilled water are added after 1.5 hours and stirring is carried out for 12 hours at room temperature. To this base varnish, variable amounts of 1H,1H,2H,2H-perfluorooctyl triethoxysilane are added with stirring, whereafter the reaction mixture is reacted at room temperature for at least 2 hours, the concentration of fluorosilane being 0.01 to 0.25 mol of fluorosilane per mol of MEMO.

For the coating of substrates, for example glass, 0.5 to 2% by weight, preferably 1% by weight, of photoinitiator is added to the varnish thus obtained. The choice of photoinitiator depends on the emission spectrum of the UV-lamp employed for the curing of the layer. With UV-lamps emitting radiation in the range of 254 nm, Irgacure® 184 (Ciby-Geigy) is, for example, employed as photoinitiator. The varnish thus obtained may be filtered by means of membrane filters having a pore diameter of 0.2 to 0.8 µm. Plate coating, dipping, spraying and spinning are suitable types of coating methods, it being possible to add water-soluble solvents such as butanol for the adjustment of optimum varnish parameters (e.g. viscosity).

The curing of the varnish applied is carried out in a two-step process, i.e., by initial irradiation with UV-light in order to effect the polymerization of the unsaturated organic groups present. To this end, the coated substrates are passed under 1 or 2 UV-tubes, each having an output of 1000 watt, at a rate of 0.5 to 2 m/min, preferably 1 m/min, whereafter the varnish is fingerdry. The second curing step consists of heating at 130° C. in a circulating air dryer for 1 hour. (The curing of the coating may, however, also be effected exclusively by means of radiation or exclusively thermally).

EXAMPLE 2

Example 1 is carried out analoguously, but employing $C_8F_{17}CH_2CH_2Si(OC_2H_5)_3$ instead of $C_6F_{13}CH_2CH_2Si(OC_2H_5)_3$.

EXAMPLE 3

The process of example 1 is repeated, but using mixtures of the compounds employed in examples 1 and 2 in different weight ratios.

EXAMPLE 4

The process of example 1 is carried out analoguously, but using $CF_3CH_2CH_2Si(CH_3)(OC_2H_5)_2$ as fluorinated compound.

EXAMPLE 5

1.5 mol of $H_2O$ is added to 1 mol of MEMO and the resulting mixture is then stirred at room temperature for 12 to 50 hours. Thereafter, 0.01 to 0.25 mol of one of the fluorinated silanes employed in the above examples is added thereto. Following the addition of 0.5 mol of $H_2O$ per mol of ethoxy group introduced by said fluorosilane the solution is stirred until homogeneous (about 10 minutes). Subsequently 0.1 to 0.3 mol of zirconiumtetrapropylate, either as such or in admixture with 0.1 to 0.6 mol of methacrylic acid, are added thereto, whereafter up to 2 mols of $H_2O$ per mol of zirconium tetra-propylate employed are added. Then the resulting mixture is stirred for about 1 hour at room temperature. The varnish thus prepared is employed for the coating of glass, polycarbonate, polyacrylate, polymethyl methacrylate and polyethylene terephthalate analoguously to example 1.

We claim:

1. A coating composition comprising a polycondensate of one or more hydrolyzable compounds of at least one element M selected from the group consisting of elements of groups IIIA to VA and groups IIB to IVB of the Periodic Table of Elements having hydrolyzable groups A, at least a portion of said hydrolyzable compounds also having non-hydrolyzable carbon-containing groups B, wherein the total molar ratio of groups A to groups B in said hydrolyzable compounds is from 10:1 to 1:2, and wherein 0.1 to 500 mol. % of said groups B are groups B' which on the average contain 5 to 30 fluorine atoms bonded to one or more aliphatic carbon atoms, where said carbon atoms are separated from said element M by at least two atoms.

2. The composition of claim 1, wherein said element M are selected from the group consisting of Si, Al, B, Pb, Sn, Ti, Zr, V, Zn and mixtures thereof.

3. The composition of claim 2, wherein said element M is selected from the group consisting of Si, Al, Ti, Zr and mixtures thereof.

4. The composition of claim 1, wherein the molar ratio of groups A to groups B is from 5:1 to 1:1.

5. The composition of claim 4, wherein the molar ratio of groups A to groups B is from 4:1 to 2:1.

6. The composition of claim 1, wherein 0.1–1 mol. % of said groups B are groups B'.

7. The composition of claim 6, wherein 0.1–2 mol. % of said groups B are groups B'.

8. The composition of claim 1, wherein said groups B' on average contain 5 to 25 fluorine atoms.

9. The composition of claim 8, wherein said groups B' contain on average 8 to 18 fluorine atoms.

10. The composition of claim 9, wherein said fluorine atoms are bonded to aliphatic carbon atoms which are separated from M by at least two carbon atoms.

11. The composition of claim 1, wherein 1–100 mol. % of said groups B and groups B' have at least one carbon-carbon double bond or carbon-carbon triple bond.

12. The composition of claim 11, wherein 5–85 mol. % of said groups B and groups B' have at least one carbon-carbon double bond or carbon-carbon triple bond.

13. The composition of claim 12, wherein 20–70 mol. % of said groups B and groups B' have at least one carbon-carbon double bond or carbon-carbon triple bond.

14. The composition of claim 11, wherein said groups B and groups B' are acryloxy alkyl or methacryloxy alkyl groups.

15. The composition of claim 1, wherein said element M is selected from the group consisting of Al, Ti, Zr and mixtures thereof, and wherein a portion of said groups B form a complex with said element M, wherein said complex-forming groups are selected from the group consisting of aliphatic carboxylic acids, β-diketones and β-carbonyl carboxylates; fluorinated aliphatic carboxylic acids, β-diketones and β-carbonyl carboxylates; unsaturated aliphatic carboxylic acids, β-diketones and β-carbonyl carboxylates; and fluorinated unsaturated aliphatic carboxylic acids, β-diketones and β-carbonyl carboxylates.

16. The composition of claim 11, further comprising a photoinitiator.

17. The composition of claim 11, further comprising a radically polymerizable carbon compound selected from the group consisting of styrene, acrylic acid, methacrylic acid and derivatives thereof.

18. A process for preparing a coating composition comprising a polycondensate of one or more hydrolyzable compounds of at least one element M selected from the group consisting of elements of groups IIIA to VA and groups IIB to IVB of the Periodic Table of Elements having hydrolyzable groups A, at least a portion of said hydrolyzable compounds also having non-hydrolyzable carbon-containing groups B, wherein the total molar ratio of groups A to groups B in said hydrolyzable compounds is from 10:1 to 1:2, and wherein 0.1 to 5 mol. % of said groups B are groups B' which on the average contain 5 to 30 fluorine atoms bonded to one or more aliphatic carbon atoms, wherein said carbon atoms are separated from said element M by at least two atoms, wherein said hydrolyzable compounds contain a total possible number of M—OH groups when said hydrolyzable compounds are hydrolyzed with water, comprising the steps of:

(1) hydrolyzing and precondensing said hydrolyzable compounds containing said hydrolyzable groups B and not containing said groups B' by adding water to said hydrolyzable compounds containing groups B to form a precondensate composition;

(2) adding said hydrolyzable compounds containing said groups B' to said precondensate composition; and (3) condensing and hydrolyzing said hydrolyzable compounds containing said groups B' and said precondensate composition by adding water thereto to form said coating composition;

wherein said adding step is conducted when said condensate composition has a water content not more than 5% by weight based on the total weight of said precondensate composition, and when not more than 50% of said total possible M—OH groups are present in said precondensate composition.

19. The process of claim 18, wherein at least 90 mol. % of said hydrolyzable groups A are alkoxy groups.

20. The process of claim 19, wherein at least 95 mol. % of said hydrolyzable groups A are alkoxy groups.

21. The process of claim 19, wherein said alkoxy groups are $C_{1-4}$ alkoxy groups.

22. The process of claim 21, wherein said alkoxy groups are methoxy or ethoxy groups.

23. The process of claim 18, wherein said element M is selected from the group consisting of Si, Al, Zr, Ti and mixtures thereof.

24. The process of claim 18, wherein said adding step is conducted when said precondensate composition has a water content not more than 3.5% by weight.

25. The process of claim 24, wherein said adding step is conducted when said precondensate composition has a water content not more than 2% by weight.

26. The process of claim 18, wherein the molar ratio of the total water added to hydrolyzable groups A is from 1:1 to 0.3:1.

27. The process of claim 26, wherein said molar ratio of the total water added to hydrolyzable groups A is from 0.7:1 to 0.5:1.

28. The process of claim 18, wherein all of said hydrolyzable compounds containing said hydrolyzable groups B and not containing said groups B' are hydrolyzed and precondensed in said hydrolyzing step (1).

29. The process of claim 18, wherein a portion of said hydrolyzable compounds containing said hydrolyzable groups B and not containing said groups B' is added during said hydrolyzing step (1) and the remainder of said hydrolyzable compounds containing said hydrolyzable groups B and not containing said groups B' is added to said precondensate composition.

30. A coating composition prepared by the process of claim 18.

* * * * *

UNITED STATES PATENT AND TRADEMARK OFFICE
CERTIFICATE OF CORRECTION

PATENT NO. : 5,644,014
DATED : July 1, 1997
INVENTOR(S) : Helmut SCHMIDT, et al.

It is certified that error appears in the above-indentified patent and that said Letters Patent is hereby corrected as shown below:

On the title page, item [87], the PCT Pub. should be:

--[87] PCT Pub. No.: WO92/21729
       PCT Pub. Date: Dec. 10, 1992--

Signed and Sealed this

Sixteenth Day of September, 1997

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,644,014

DATED : JULY 1, 1997

INVENTOR(S) : HELMUT SCHMIDT ET AL.

It is certified that error appears in the above-identified patent and that said Letters Patent is hereby corrected as shown below:

Column 10, line 17, "0.1 to 500 mol. %" should read
--0.1 to 5 mol. %--.

Signed and Sealed this

Seventeenth Day of November, 1998

Attest:

BRUCE LEHMAN

*Attesting Officer*   *Commissioner of Patents and Trademarks*